United States Patent

Osawa et al.

Patent Number: 5,827,921
Date of Patent: Oct. 27, 1998

[54] SILICONE-BASED AQUEOUS EMULSION COMPOSITION

[75] Inventors: Yoshihito Osawa; Sachiko Nezu; Yoshinobu Takahashi; Satoshi Kuwata, all of Gunma-ken, Japan

[73] Assignee: Shin-Etsu Chemical Co., Ltd., Japan

[21] Appl. No.: 757,553

[22] Filed: Nov. 27, 1996

[30] Foreign Application Priority Data

Nov. 29, 1995 [JP] Japan .................................. 7-310284

[51] Int. Cl.$^6$ .................................................. C08L 83/00
[52] U.S. Cl. .................... 524/837; 524/188; 524/730; 524/731; 524/847
[58] Field of Search .................................. 524/837, 847, 524/730, 731, 188

[56] References Cited

U.S. PATENT DOCUMENTS 4,978,704  12/1990  Perrin ........................................ 524/731
5,679,727  10/1997  Griffith et al. ............................ 524/730

FOREIGN PATENT DOCUMENTS 81043264B  10/1981  Japan .

*Primary Examiner*—Melvyn I. Marquis
*Attorney, Agent, or Firm*—Millen, White, Zelano & Branigan, P.C.

[57] ABSTRACT

A novel silicone-based coating composition in the form of an aqueous emulsion is proposed which is capable of giving a rubber-like cured coating film of excellent mechanical strengths and flexibility on the surface of various substrate materials exhibiting high adhesive bonding thereto. The composition comprises:

(a) water as the dispersion medium of the emulsion; and
(b) a combination of the ingredients as the dispersed phase comprising:
 (A) 100 parts by weight of an organopolysiloxane having, in a molecule, at least two alkenyl groups bonded to the silicon atoms;
 (B) from 0.05 to 20 parts by weight of an organohydrogen polysiloxane having, in a molecule, at least two hydrogen atoms directly bonded to the silicon atoms;
 (C) from 1 to 100 parts by weight of a colloidal silica or a polyorganosilsesquioxane;
 (D) from 0.5 to 20 parts by weight of a reaction product of an amino group-containing organosilane compound and a carboxylic acid anhydride compound; and
 (E) from 0.0001 to 1 part by weight of a catalytic compound for the hydrosilation reaction between the alkenyl groups in the ingredient (A) and the silicon-bonded hydrogen atoms in the ingredient (B).

19 Claims, 1 Drawing Sheet

SILICONE-BASED AQUEOUS EMULSION COMPOSITION

BACKGROUND OF THE INVENTION

The present invention relates to a silicone-based aqueous emulsion composition or, more particularly, to a silicone-based aqueous emulsion composition capable of being readily cured to form a rubber-like coating film having excellent mechanical strengths and flexibility and exhibiting high adhesive bonding strength to the surface of various kinds of substrates without the disadvantage due to evolution of hydrogen gas so as to be useful as a protective coating agent and the like.

Various proposals have been made heretofore for a silicone-based aqueous emulsion composition capable of giving a rubber-like coating film by curing. For example, Japanese Patent Kokai 56-16553 proposes a silicone-based aqueous emulsion composition having a pH of 9 to 11.5 and comprising, as the dispersed phase in the aqueous medium, a combination of an anionically stabilized, hydroxylated organopolysiloxane, colloidal silica particles and an organic tin compound or an organic amine compound. This aqueous emulsion composition, however, is not quite satisfactory in practical applications due to the relatively low adhesion of the cured coating film to the surface of a substrate and the strong alkalinity thereof necessarily limiting the fields of practical application of the composition.

Various proposals and attempts have been made heretofore with an object to overcome the above mentioned disadvantages in the silicone-based aqueous emulsion compositions of the above mentioned type. For example, Japanese Patent Kokai 54-131661 proposes an organopolysiloxane-based latex composition of which the organopolysiloxane is obtained by the emulsion polymerization of a mixture of a cyclic organosiloxane oligomer and an organo trialkoxy silane compound having a functional group such as an aminoalkyl trialkoxy silane compound in an aqueous medium containing a sulfonic acid-based surface active agent or a quaternary ammonium salt as the surface active agent. U.S. Pat. No. 3,817,894 discloses another silicone-based aqueous emulsion composition comprising a block-copolymeric organopolysiloxane consisting of the dimethyl siloxane units and the monophenyl siloxane units, cationic surface active agent, non-ionic surface active agent and amino-functional organosilane compound as dispersed in an aqueous medium. Further, Japanese Patent Kokai 58-101153 proposes a silicone-based aqueous emulsion composition comprising a hydroxyl group-containing organopolysiloxane in the form of an emulsion, reaction product of an amino-functional silane compound and a carboxylic acid anhydride, colloidal silica and curing catalyst.

Though not ineffective in improving the adhesion of the cured coating film to the substrate surface, the improvement in this regard is still far from satisfactory in each of the above proposed compositions in addition to the low mechanical strengths of the cured coating films formed therefrom to limit the application fields of the composition to exclude heavy-duty services, in which the coating film is subjected to a great local stress, such as joint sealing of concrete structures, reinforcement of seam lines in sewed fabric materials and the like.

Although the inventors have tested a silicone-based aqueous emulsion composition comprising an alkoxy group-containing organopolysiloxane and an organohydrogen polysiloxane having hydrogen atoms directly bonded to the silicon atoms to accomplish remarkable improvements in several respects, such a composition has a problem due to evolution of hydrogen gas formed in the curing reaction which is a condensation reaction involving the silicon-bonded hydrogen atoms resulting in occurrence of pinholes and voids in the cured coating film.

Accordingly, it is eagerly desired to develop a novel and improved silicone-based aqueous emulsion composition capable of being cured on drying without evolution of hydrogen gas to give a rubbery coating film having excellent mechanical strengths and flexibility and exhibiting good adhesion to the surface of various kinds of substrate materials.

SUMMARY OF THE INVENTION

The present invention accordingly has an object, in view of the above described problems and disadvantages of similar compositions in the prior art, to provide a silicone-based aqueous emulsion composition capable of giving an excellent rubber-like coating film by drying and curing on a substrate surface without the disadvantages above mentioned.

Thus, the silicone-based aqueous emulsion composition provided by the invention comprises:

(a) water as the dispersion medium of the emulsion composition; and
(b) a combination of the ingredients as the dispersed phase in the dispersion medium comprising:
  (A) 100 parts by weight of an organopolysiloxane having, in a molecule, at least two alkenyl groups bonded to the silicon atoms;
  (B) from 0.05 to 20 parts by weight of an organohydrogen polysiloxane having, in a molecule, at least two hydrogen atoms directly bonded to the silicon atoms;
  (C) from 1 to 100 parts by weight of a powder of colloidal silica or polyorganosilsesquioxane;
  (D) from 0.5 to 20 parts by weight of a reaction product of an amino group-containing organosilane compound and a carboxylic acid anhydride compound;
  (E) from 0.0001 to 1 part by weight of a catalytic compound for the hydrosilation reaction between the alkenyl groups in the ingredient (A) and the silicon-bonded hydrogen atoms in the ingredient (B); and, optionally,
  (F) up to 20 parts by weight of an organosilane compound having an epoxy group in the molecule or a partial hydrolysis-condensation product thereof.

DETAILED DESCRIPTION OF THE PREFERRED EMBODIMENTS

Figure 1A:
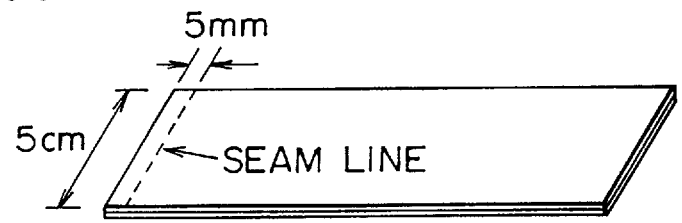
FIGS. 1A and 1B schematically illustrate the testing procedure for the tear strength along the seam line of cloths reinforced by coating with the inventive silicone-based emulsion composition by a plan view and by a perspective view, respectively, of the test specimen.

As is described above, the aqueous emulsion composition of the invention is an emulsified dispersion which comprises: (a) water as the dispersion medium of the composition; and (b) a dispersed phase consisting of a combination of the ingredients including the essential ingredients (A) to (E) and an optional ingredient (F) each in a specified proportion relative to the ingredient (A). When a coating layer of the composition on the surface of a substrate is dried by removing water, the dried composition is cured to form a uniform rubber-like coating film without evolution of hydrogen gas by the hydrosilation reaction between the silicon-bonded alkenyl groups in the ingredient (A) and the silicon-bonded hydrogen atoms in the ingredient (B) while the coating film thus formed exhibits good adhesion to the substrate surface on which the composition has been cured and has excellent mechanical strengths and flexibility.

The ingredient (A) in the dispersed phase of the inventive composition is an organopolysiloxane having, in a molecule, at least two alkenyl groups bonded to the silicon atoms as represented by the general formula

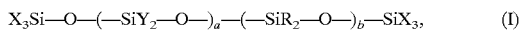

in which each R is, independently from the others, a monovalent hydrocarbon group selected from the group consisting of alkyl groups and aryl groups having 20 or less carbon atoms or, preferably, a methyl group, each X is, independently from the others, a hydroxy group, an alkoxy group having 20 or less carbon atoms or a monovalent hydrocarbon group selected from the group consisting of alkyl groups, alkenyl groups and aryl groups having 20 or less carbon atoms, each Y is, independently from the others, X or a siloxy group represented by the general formula —(—O—SiX$_2$)$_c$X, X being as defined above and the subscript c being a positive integer not exceeding 1000, the subscript a is 0 or a positive integer not exceeding 1000 and the subscript b is a positive integer in the range from 100 to 10000, with the proviso that at least two of the groups denoted by X in a molecule are alkenyl groups such as vinyl groups.

Particular examples of the group denoted by the symbol R in the above given general formula (I), which is a monovalent hydrocarbon group having 20 or less carbon atoms such as alkyl and aryl groups, include methyl, ethyl, propyl, butyl, pentyl, hexyl, heptyl, octyl, decyl, tetradecyl, octadecyl, phenyl, tolyl and naphthyl groups, of which R is preferably a methyl group. The group denoted by X in the general formula (I) is a hydroxy group, an alkoxy group having 20 or less carbon atoms such as methoxy, ethoxy, propoxy, butoxy, hexyloxy, heptyloxy, octyloxy, decyloxy, tetradecyloxy and octadecyloxy groups, or a monovalent hydrocarbon group having 20 or less carbon atoms including alkyl, aryl and alkenyl groups. The alkyl and aryl groups here each can be the same one as given above for the examples of the groups denoted by R while the alkenyl group is exemplified by vinyl and allyl groups, of which vinyl is preferred. The group denoted by Y is the same group as X or a siloxy group represented by the general formula —(—O—SiX$_2$)$_c$X, in which X has the same meaning as defined above and the subscript c is a positive integer not exceeding 1000.

It is essential in the inventive composition that at least two of the groups denoted by X in an atom of the ingredient (A) are alkenyl groups such as vinyl and allyl groups since the coating film of the composition is cured by the mechanism of the hydrosilation reaction between the silicon-bonded alkenyl groups in the ingredient (A) and the silicon-bonded hydrogen atoms in the ingredient (B) described later. It is preferable that the organopolysiloxane as the ingredient (A) contains the silicon-bonded alkenyl, e.g., vinyl, groups in an amount in the range from $1 \times 10_{-6}$ to $1 \times 10^{-4}$ mole/g.

The subscript a in the general formula (I) is 0 or a positive integer not exceeding 1000 or, preferably, not exceeding 100. The subscript b is a positive integer in the range from 100 to 10000 or, preferably, in the range from 1000 to 5000. When the value of b is too small, the cured coating film formed from the composition would have poor flexibility while, when the value of b is too large, a decrease would be caused in the tear strength of the cured coating film.

The following formulae are only several examples expressing the organopolysiloxane suitable as the ingredient (A), in which the symbols Me, Et, Vi and Ph denote methyl, ethyl, vinyl and phenyl groups, respectively:

(1) Me$_3$Si—O—(—SiMeVi—O—)$_a$—(—SiMe$_2$—O—)$_b$—SiMe$_3$;

(2) Vi—Me$_2$Si—O—(—SiMeVi—O—)$_a$—(—SiMe$_2$—O—)$_b$SiMe$_2$—Vi;

(3) Vi$_3$Si—O—(—SiMeVi—O—)$_a$—(—SiMe$_2$—O—)$_b$—SiVi$_3$;

(4) Vi—Me$_2$Si—O—(—SiMe$_2$—O—)$_b$SiMe$_2$—Vi;

(5) Vi$_3$Si—O—(—SiMe$_2$—O—)$_b$—SiVi$_3$;

(6) HO—Me$_2$Si—O—(—SiMeVi—O—)$_a$—(—SiMe$_2$—O—)$_b$—SiMe$_2$—OH, in which a is 2 or larger;

(7) MeO—Me$_2$Si—O—(—SiMeVi—O—)$_a$—(—SiMe$_2$—O—)$_b$—SiMe$_2$—OMe, in which a is 2 or larger;

(8) HO—Me$_2$Si—O—[—SiVi(OH)—O—]$_a$—(—SiMe2—O—)$_b$—SiMe2—OH, in which a is 2 or larger;

(9) MeO—Me$_2$Si—O—[—Si(OMe)Vi—O—]$_a$—(—SiMe$_2$—O—)$_b$—SiMe$_2$—OMe, in which a is 2 or larger;

(10) HO—Me$_2$Si—O—(—SiMeVi—O—)$_{a1}$—[—Si(OH)Ph—O—]$_{a2}$—(—SiMe$_2$—O—)$_b$—SiMe$_2$—OH, in which a1+a2=a and a1 is 2 or larger;

(11) EtO—Me$_2$Si—O—(—SiMeVi—O—)$_{a1}$—[—Si(OEt)Ph—O—]$_{a2}$—(—SiMe$_2$—O—)$_b$—SiMe$_2$—OEt, in which a1+a2=a and a1 is 2 or larger;

(12) HO—Me$_2$Si—O—(—SiMeVi—O—)$_{a1}$—[—Si(OH)Me—O—]$_{a2}$—(—SiMe$_2$—O—)$_b$—SiMe$_2$—OH, in which a1+a2=a and a1 is 2 or larger;

(13) MeO—Me$_2$Si—O—(—SiMeVi—O—)$_{a1}$—[—Si(OMe)Me—O—]$_{a2}$—(—SiMe$_2$—O—)$_b$—SiMe$_2$—OMe, in which a1+a2=a and $a_1$ is 2 or larger;

(14) HO—Me$_2$Si—O—(—SiViY$^1$—O—)$_a$—(—SiMe$_2$—O—)$_b$—SiMe$_2$—OH, in which y$^1$ is a siloxy group of the formula —(—O—SiMe$_2$)$_c$—OH and a is 2 or larger;

(15) MeO—Me$_2$Si—O—(—SiViY$^2$—O—)$_a$—(—SiMe$_2$—O—)$_b$—SiMe$_2$—OMe, in which y$^2$ is a siloxy group of the formula —(—O—SiMe$_2$)$_c$—OMe and a is 2 or larger; and

(16) Me$_3$Si—O—(—SiMeVi—O—)$_{a1}$—(—SiMey$^2$—O—)$_{a2}$—(—SiMe$_2$—O—)$_b$—SiMe$_2$—OMe, in which y$^2$ is as defined above, a1+a2=a and a1 is 2 or larger.

The procedure for the synthetic preparation of the organopolysiloxane as the ingredient (A) defined above is well known in the art of silicones. For example, the organopolysiloxane can be obtained by conducting an alkali-catalyzed siloxane-rearrangement equilibration reaction of a mixture consisting of a cyclic organosiloxane oligomer such as octamethyl cyclotetrasiloxane, vinyl group-containing cyclic or linear organosiloxane oligomer such as 2,4,6,8-tetramethyl-2,4,6,8-tetravinyl cyclotetrasiloxane, 1,1,3,3-tetramethyl-1,3-divinyl disiloxane and hexavinyl disiloxane and/or vinyl group-containing organosilane compound such as trimethoxy vinyl silane and dimethoxy methyl vinyl silane as a source for vinyl groups and other optional organosilane or organopolysiloxane compounds such as hexamethyl disiloxane, α,ω-dihydroxy dimethylsiloxane oligomers, dimethoxy dimethyl silane, diethoxy dimethyl silane, trimethoxy methyl silane, triethoxy methyl silane and triethoxy phenyl silane in the presence of an alkaline catalyst such as an alkali metal hydroxide.

It is preferable in the preparation of the inventive emulsion composition that the organopolysiloxane as the ingredient (A) is compounded with other ingredients in the form of an aqueous emulsion prepared in advance. In this regard, it would be advantageous that the organopolysiloxane as the ingredient (A) is prepared by the known method of emulsion polymerization in which the above mentioned organosilane and organopolysiloxane compounds as the starting materials are emulsified in water by the use of an anionic or cationic surface active agent with addition of an acidic or alkaline compound as the catalyst for the polymerization reaction.

The ingredient (B), which serves as a crosslinking agent for the ingredient (A) described above, is an organohydrogen polysiloxane having, in a molecule, at least two hydrogen atoms directly bonded to the silicon atoms, as represented by the general formula

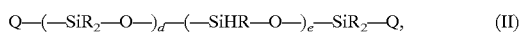

$$Q-(-SiR_2-O-)_d-(-SiHR-O-)_e-SiR_2-Q, \qquad (II)$$

in which R has the same meaning as defined for the general formula (I) or, preferably, is a methyl group, Q is R or a hydrogen atom, the subscript d is a positive integer not exceeding 1000 and the subscript e is 0 or a positive integer not exceeding 1000 with the proviso that, when e is 0, each Q is a hydrogen atom and, when e is 1, at least one of the groups denoted by Q is a hydrogen atom. It is preferable, when the organopolysiloxane as the ingredient (A) has only two silicon-bonded alkenyl groups in a molecule, that the organohydrogen polysiloxane as the ingredient (B) has at least three silicon-bonded hydrogen atoms in a molecule in order to obtain good curability of the composition. Although the above given general formula (II) defines an organohydrogen polysiloxane having a straightly linear molecular structure, a small amount of branched structures can be contained therein without particular disadvantages.

Though not particularly limitative, examples of the organohydrogen polysiloxane suitable as the ingredient (B) include those expressed by the following formulae, in which Me is a methyl group:

Me—(—SiMe₂—O—)_d—(—SiHMe—O—)_e—SiMe₃;

H—(—SiMe₂—O—)_d—(—SiHMe—O—)_e—SiMe₂—H;

Me₃Si—O—(—SiHMe—O—)_e—SiMe₃, in which e is 2 or larger; and

H—(—SiMe₂—O—)_d—SiMe₂—H.

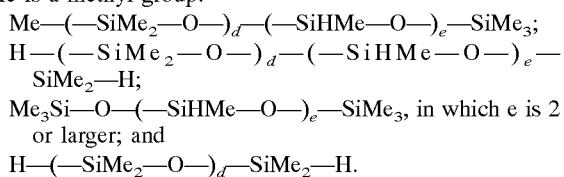

The method for the synthetic preparation of the organohydrogen polysiloxane as the ingredient (B) is also well known in the art of silicones. Similarly to the preparation of the organopolysiloxane as the ingredient (A), for example, the process of emulsion polymerization or a siloxane-rearrangement equilibration reaction is conducted with a mixture of a cyclic organosiloxane oligomer having a silicon-bonded hydrogen atom and hexamethyl disiloxane or 1,1,3,3-tetramethyl disiloxane. Alternatively, the organohydrogen polysiloxane can be prepared by the cohydrolysis-cocondensation reaction of methyl dichlorosilane, trimethyl chlorosilane, dimethyl chlorosilane and the like in combination. Since it is preferable that the organohydrogen polysiloxane as the ingredient (B) is compounded with the other ingredients in the form of an aqueous emulsion prepared in advance, the former method of the emulsion copolymerization is preferred.

The amount of the organohydrogen polysiloxane as the ingredient (B) in the inventive emulsion composition is, per 100 parts by weight of the organopolysiloxane as the ingredient (A), in the range from 0.05 to 20 parts by weight or, preferably, from 0.1 to 10 parts by weight. When the amount thereof is too small, the crosslinking density in the coating film after curing cannot be high enough resulting in a decrease in the mechanical strengths of the cured coating film along with a decrease in the adhesive bonding strength of the coating film to the substrate surface as well as a decrease in the flame retardancy of the coating film. When the amount thereof is too large, on the other hand, the crosslinking density in the cured coating film is too high so that the coating film is too rigid without flexibility. It is preferable that the amount of the organohydrogen polysiloxane as the ingredient (B) is such that the molar proportion of the silicon-bonded hydrogen atoms in the ingredient (B) to the alkenyl groups in the ingredient (A) is in the range from 0.01 to 1.0.

The ingredient (C), which serves as a reinforcing agent and as a flame retardant agent of the cured coating film, is a finely divided powder of a so-called colloidal silica or a polyorganosilsesquioxane exemplified by a polymethyl silsesquioxane which is a hydrolysis-condensation product of methyl trialkoxy silane, e.g., methyl trimethoxy silane. The polymethyl silsesquioxane can be obtained in the form of an aqueous suspension by the dropwise addition of methyl trimethoxy silane to an aqueous medium containing a surface active agent and an acidic or alkaline compound such as sulfuric acid and potassium hydroxide as the catalyst for the condensation reaction under agitation. If necessary, the degree of crosslinking in the polyorganosilsesquioxane powder can be modified by admixing the alkyl trialkoxy silane with trialkyl alkoxy silane, dialkyl dialkoxy silane and tetraalkoxy silane compounds. It is sometimes advantageous that the alkyl trialkoxy silane is admixed with a functional organosilane compound having a vinyl, epoxy, acrylic or methacrylic group and subjected to a cohydrolysis-cocondensation reaction with these additional silane compounds so that the resultant polyorganosilsesquioxane powder is imparted with reactivity. The silicon dioxide particles of a colloidal silica and polyorganosilsesquioxane have an average particle diameter in the range from 5 to 200 nm.

The amount of the ingredient (C) in the inventive emulsion composition is in the range from 1 to 100 parts by weight or, preferably, in the range from 5 to 50 parts by weight per 100 parts by weight of the organopolysiloxane as the ingredient (A). When the amount thereof is too small, the cured coating film of the inventive composition cannot be imparted with the desired reinforcing and flame-retardant effects. When the amount thereof is too large, on the other hand, the cured coating film would be rigid and brittle and would not exhibit good elongation and flexibility. It is of course optional that the ingredient (C) is a combination of a colloidal silica and a polyorganosilsesquioxane powder in any proportions.

The ingredient (D) is a product obtained by the reaction between an amino group-containing organosilane compound and a carboxylic acid anhydride compound and serves as an adhesion-improver between the cured rubber-like coating film and the substrate surface on which the coating film of the composition is cured. The amino group-containing organosilane compound is represented by the general formula

$$A-SiR_g(OR)_{3-g}, \qquad (III)$$

in which R has the same meaning as defined for the ingredient (A), A is an unsubstituted or substituted amino-containing group of the general formula —R¹—(—NH—R¹—)_h—NH—R², each R¹ being, independently from the others, a divalent hydrocarbon group having up to 6 carbon atoms, $R^2$ being $R^1$ or a hydrogen atom and the subscript h being 0 or a positive integer not exceeding 6, and the subscript g is 0, 1 or 2. Examples of the amino group-containing organosilane compound include 3-aminopropyl triethoxy silane, 3-aminopropyl diethoxy methyl silane, N-(2-aminoethyl)-3-aminopropyl trimethoxy silane and N-(2-aminoethyl)-3-aminopropyl dimethoxy methyl silane, though not particularly limitative thereto. The acid anhydride compound to be reacted with the above described amino-containing silane compound, on the other hand, is exemplified by phthalic anhydride, succinic anhydride, methylsuccinic anhydride, maleic anhydride, glutaric anhydride, itaconic anhydride and the like.

In conducting the reaction of the acid anhydride compound with the amino-containing silane compound, it is preferable that the reaction mixture is prepared from at least 1 mole of the acid anhydride compound per mole of the —NH— groups in the amino-containing silane compound so that the resultant compound has at least one amido group or at least one amine-carboxylic acid salt group per molecule from the standpoint of obtaining good improvement in the adhesion of the cured coating film to the substrate surface. The reaction is undertaken in an organic solvent such as alcohols under agitation at a temperature in the range from room temperature to 100° C. so that the reaction is complete usually within 1 to 30 hours to form an amido linkage by the reaction between the amino groups and the carboxylic acid anhydride or a salt between the amino group and the carboxyl group formed by the hydrolytic ring opening reaction of the acid anhydride ring by the water contained in the alcohol.

It is essential that the amino silane compound and the carboxylic acid anhydride compound are used in the inventive composition in the form of a reaction product prepared in advance and they cannot be used individually since, if they are added to the composition separately, the stability of the composition is greatly decreased along with possible retardation of the hydrosilation reaction between the ingredients (A) and (B).

The amount of the ingredient (D) in the inventive emulsion composition is in the range from 0.5 to 20 parts by weight or, preferably, from 1 to 10 parts by weight per 100 parts by weight of the organopolysiloxane as the ingredient (A). When the amount thereof is too small, no substantial improvement can be obtained in the adhesion of the cured coating film to the substrate surface while, when the amount thereof is too large, the cured coating film of the composition would suffer from a decrease in the flexibility.

The ingredient (E) is a catalyst to promote the hydrosilation reaction between the silicon-bonded alkenyl groups in the ingredient (A) and the silicon-bonded hydrogen atoms in the ingredient (B). Suitable catalytic compounds are well known in the art of silicones including platinum compounds and rhodium compounds, of which platinum compounds are preferred. The platinum compound is exemplified by chloroplatinic acid, alcohol-modified chloroplatinic acid, complexes of chloroplatinic acid with a vinyl siloxane compound and the like, of which the chloroplatinic acid-vinyl siloxane complexes are preferable and alcohol-modified products of such a complex or, in particular, those disclosed in Japanese Patent Publication 33-9969 are more preferable. The rhodium catalyst is exemplified by the compound of the formula $RhCl(Ph_3P)_3$, in which Ph is a phenyl group, disclosed in Japanese Patent Kokai 4-352793. It is preferable that these platinum or rhodium compounds as the ingredient (E) are compounded with the other ingredients in the form of an aqueous emulsion prepared in advance by emulsifying a mixture of the compound and an alkenyl group-containing organopolysiloxane in water containing a surface active agent.

The compounding amount of the ingredient (E) as the catalyst in the inventive emulsion composition is in the range from 0.0001 to 1 part by weight or, preferably, from 0.005 to 0.1 part by weight per 100 parts by weight of the organopolysiloxane as the ingredient(A). When the amount thereof is too small, no catalytic effect can be obtained for promotion of the hydrosilation reaction while an excessively large amount thereof has no particular additional advantageous effects rather with an economical disadvantage due to the expensiveness of the platinum or rhodium compound.

The ingredient (F), which is optionally compounded in the inventive emulsion composition, is an epoxy group-containing organosilane compound or a partial hydrolysis-condensation product thereof to serve as an adhesion improver between the cured coating film of the composition and the substrate surface on which the coating film is cured. Examples of suitable epoxy group-containing organosilane compounds include 3-glycidyloxypropyl trimethoxy silane, 3-glycidyloxypropyl dimethoxy methyl silane, 2-(3,4-epoxy-cyclohexyl)ethyl trimethoxy silane, 2-(3,4-epoxycyclohexyl)ethyl dimethoxy methyl silane and the like. The amount of the ingredient (F), if compounded, in the inventive emulsion composition should not exceed 20 parts by weight or, preferably, should not exceed 10 parts by weight per 100 parts by weight of the organopolysiloxane as the ingredient (A). When the amount thereof is too large, a decrease is caused in the flexibility of the cured coating film of the inventive composition while no noticeable improvement can be obtained in the adhesion when the amount thereof is too small, for example, to be smaller than 1 part by weight per 100 parts by weight of the ingredient (A).

The silicone-based aqueous emulsion composition of the invention can be prepared by mixing and emulsifying the above described essential ingredients (A) to (E) and optional ingredient (F) in water containing a surface active agent which can be selected from anionic, non-ionic, cationic and amphoteric surface active agents without particular limitations.

Suitable surface active agents include salts of alkylsulfuric acid, salts of alkylbenzene sulfonic acid, salts of alkylphosphoric acid and the like as the examples of the anionic surface active agents, polyoxyethylene alkyl ethers, polyoxyethylene alkylphenyl ethers, polyoxyethylene fatty acid esters and the like as the examples of the non-ionic surface active agents, quaternary ammonium salts, alkylamine acetates and the like as the examples of the cationic surface active agents and alkyl betaines, alkyl imidazolines and the like as the examples of the amphoteric surface active agents.

It is of course optional that the silicone-based aqueous emulsion composition of the invention is admixed, according to need, with various kinds of other known additives including moderators for the hydrosilation reaction and those conventionally formulated in coating compositions and fabric-finishing agents such as thickening agents, antifoam agents, pigments, inorganic bodying powders, penetrants, antistatic agents, antiseptic agents and so on each in a limited amount.

The silicone-based aqueous emulsion composition of the invention prepared in the above described manner is used as a coating agent on the surface of various kinds of substrate materials. Namely, the composition is applied to the substrate surface by any known method such as brush coating, roll coating, spray coating, knife coating, dip coating and the like and the thus coated substrate is then subjected to drying and heating to effect curing of the coating film thereon forming a rubber-like coating film. Other application fields of the inventive composition include fabric-finishing agents, surface-release agents, back-surface releasing agents of pressure-sensitive adhesive tapes and sheets, binders for inorganic and organic materials and so on.

In the following, the silicone-based aqueous emulsion composition of the invention is illustrated in more detail by way of Examples and Comparative Examples, in which the term of "parts" always refers to "parts by weight", as preceded by the description of the preparation procedures of the respective ingredients. The coating films obtained from the respective aqueous emulsion compositions as prepared in the Examples and-Comparative Examples were evaluated for the following items by the testing methods described there.

(1) Properties of the cured coating film and adhesion thereof to the substrate surface A cured film having a thickness of about 1 mm was prepared by spreading the silicone-based aqueous emulsion composition over a framed casting plate of a fluorocarbon resin followed by standing as such at room temperature for 48 hours and heating at 105° C. for 1 hour to effect drying and curing of the composition.

(Uniformity of film)

The thus prepared film was visually inspected for the appearance to record the results in three ratings of:

"A" for complete uniformity of the film without foaming;

"B" for foaming, which, however, was not so heavy as to disturb measurement of film properties; and "C" for foaming, which was so heavy as to disturb measurement of film properties.

(Tensile properties)

The 1 mm-thick film prepared as described above was subjected to the measurements of the ultimate elongation at break and tensile strength according to the procedure specified in JIS K 6301. These tensile tests could not be undertaken for a cured film of which the uniformity of the film relative to foaming was rated as "C".

(Adhesion to substrate surface)

Further, the emulsion composition was cast on several casting plates of different materials as a substrate and dried and cured thereon in the same curing schedule as above to give a cured film of about 1 mm thickness. The adhesion of the thus cured coating film to the substrate surface was tested in a peeling test by pulling the film at an end in a perpendicular direction to the substrate surface at a velocity of about 300 mm/minute to record the condition of peeling in three ratings of:

"A" for cohesive failure of the film without peeling from the substrate surface due to high adhesive bonding strength;

"B" for adhesive failure but with a substantial pulling force for peeling; and

"C" for ready peeling of the film with only an insignificant pulling force.

(2) Evaluation as a fabric coating agent

The silicone-based aqueous emulsion composition was admixed under agitation with carboxymethyl cellulose (Cellogen F, a product by Dai-ichi Kogyo Seiyaku Co.) as a thickening agent in such an amount that the viscosity of the emulsion was increased to 18000 centipoise at room temperature. The thus viscosity-adjusted emulsion composition was applied by knife coating to a plain-woven cloth prepared from nylon-66 filaments of 420 denier fineness in a 46 counts/inch for each of the wefts and warps in a coating amount of about 44 to 48 g/m² as dried and heated at 180° C. for 2 minutes to effect drying and curing of the composition. The test specimen of the coated cloth obtained in this manner was subjected to the evaluation tests as follows.

(Flexibility)

The resistance force in g against bending was measured for the test specimen of 15 cm width by using a fabric feeling tester of the Uenoyama type. A smaller resistance value means better flexibility. The resistance value of the uncoated cloth was 15 g.

(Tear strength along seam line)

Figure 1B:
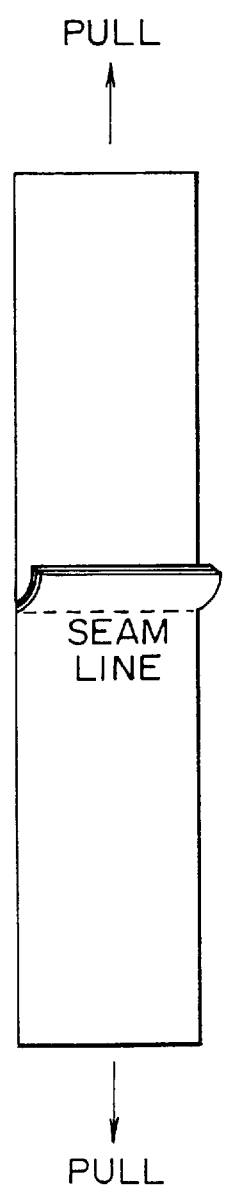

Two strips of the test cloth each having a width of 5 cm laid one on the other were sewed together using a polyester thread along a line 5 mm apart from the ends of the strips as is illustrated in FIG. 1A and the two strips were pulled right and left as is illustrated in FIG. 1B to record the pulling force in kgf when rupture took place along the seam line. The tear strength along the seam line obtained with strips of the uncoated cloth was 20 kgf.

(Flame retardancy)

Measurement of the burning propagation velocity was performed according to the FMVSS-302 method. The test specimen could be rated as flame retardant when the burning propagation velocity did not exceed 101.2 mm/minute. The flame retardancy of the uncoated cloth could not be determined due to heavy dripping under burning.

Preparation of Emulsion A1.

A mixture consisting of 385.4 g of octamethyl cyclotetrasiloxane, 13.4 g of 2,4,6,8-tetramethyl-2,4,6,8-tetravinyl cyclotetrasiloxane, 1.2 g of triethoxy phenyl silane and 100 g of a 10% aqueous solution of dodecylbenzene sulfonic acid was agitated by using a homomixer followed by gradual addition of 500 g of water under agitation to give an aqueous emulsion which was subjected to secondary emulsification by passing through a high-pressure homogenizer to give a stable aqueous emulsion. The aqueous emulsion was heated under agitation at 50° C. for 24 hours to effect the ring-opening polymerization reaction of the cyclic organosiloxane oligomers followed by standing at 25° C. for 24 hours and neutralization of the dodecylbenzene sulfonic acid with a 10% aqueous solution of sodium carbonate to give an aqueous emulsion of an organopolysiloxane containing 36.9% by weight of non-volatile matters, which is referred to as the Emulsion A1 hereinafter. The organopolysiloxane contained in the Emulsion A1 could be expressed by the formula below, in which Me, Vi and Ph denote methyl, vinyl and phenyl groups, respectively:

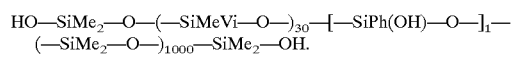

HO—SiMe$_2$—O—(—SiMeVi—O—)$_{30}$—[—SiPh(OH)—O—]$_1$—(—SiMe$_2$—O—)$_{1000}$—SiMe$_2$—OH.

Preparation of Emulsion A2.

A mixture consisting of 353.2 g of octamethyl cyclotetrasiloxane, 45.6 g of 2,4,6,8-tetramethyl-2,4,6,8-tetravinyl cyclotetrasiloxane, 1.2 g of triethoxy phenyl silane and 100 g of a 10% aqueous solution of dodecylbenzene sulfonic acid was agitated by using a homomixer followed by gradual addition of 500 g of water under agitation to give an aqueous emulsion which was subjected to secondary emulsification by passing through a high-pressure homogenizer to give a stable aqueous emulsion. The aqueous emulsion was heated under agitation at 50° C. for 24 hours to effect the ring-opening polymerization reaction of the cyclic organosiloxane oligomers followed by standing at 25° C. for 24 hours and neutralization of the dodecylbenzene sulfonic acid with a 10% aqueous solution of sodium carbonate to give an aqueous emulsion of an organopolysiloxane containing 36.7% by weight of non-volatile matters, which is referred to as the Emulsion A2 hereinafter. The organopolysiloxane contained in the Emulsion A2 could be expressed by the formula below, in which Me, Vi and Ph denote methyl, vinyl and phenyl groups, respectively:

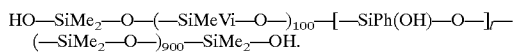

Preparation of Emulsion B1.

A mixture consisting of 300 g of a methyl hydrogen polysiloxane expressed by the formula Me—(—SiMe$_2$—O—)$_{15}$—(—SiHMe—O—)$_{15}$—SiMe$_3$ and 50 g of a polyoxyethylene (10 moles addition of ethylene oxide) nonylphenyl ether was agitated by using a homomixer followed by gradual addition of 650 g of water under agitation to give an aqueous emulsion which was subjected to secondary emulsification by passing through a high-pressure homogenizer to give a stable aqueous emulsion containing 34.1% by weight of non-volatile matters, which is referred to as the Emulsion B1 hereinafter.

Preparation of Emulsion B2.

A mixture consisting of 300 g of a methyl hydrogen polysiloxane expressed by the formula Me$_3$Si—O—(—SiHMe—O—)$_{50}$—SiMe$_3$ and 50 g of a polyoxyethylene (10 moles addition of ethylene oxide) nonylphenyl ether was agitated by using a homomixer followed by gradual addition of 650 g of water under agitation to give an aqueous emulsion which was subjected to secondary emulsification by passing through a high-pressure homogenizer to give a stable aqueous emulsion containing 34.3% by weight of non-volatile matters, which is referred to as the Emulsion B2 hereinafter.

Preparation of Emulsion C.

An aqueous solution prepared by diluting 3 g of a 10% aqueous solution of dodecylbenzene sulfonic acid with 770 g of water was admixed dropwise with 200 g of trimethoxy methyl silane under agitation at room temperature followed by continued agitation at 60° C. for 3 hours and then neutralization of the dodecylbenzene sulfonic acid with a 10% aqueous solution of sodium carbonate to give a bluish translucent aqueous emulsion of polymethyl silsesquioxane, referred to as the Emulsion C hereinafter. The content of non-volatile matters therein was 9.9% as determined by drying at 105° C. for 3 hours.

Preparation of Solution D.

A solution of 154 g of maleic anhydride in 500 g of ethyl alcohol was admixed dropwise at room temperature with 346 g of 3-aminopropyl triethoxy silane taking 1 hour and the solution was heated at 80° C. for 24 hours under reflux of ethyl alcohol to effect the reaction between the maleic anhydride and the silane compound. The thus obtained pale yellow, clear solution, referred to as the Solution D hereinafter, contained 45.1% of non-volatile matters as determined by drying at 105° C. for 3 hours. The results of the instrumental analyses undertaken for the reaction product in this solution by the methods of infrared absorption spectrophotometry, gas chromatography, nuclear magnetic resonance spectrometry and gas chromatographic-mass spectrometry indicated that about 60% by weight thereof consisted of a combination of two species, one, in the form of an amide compound and, the other, in the form of an ammonium salt expressed by the following formulas, respectively, in which Et is an ethyl group:

(EtO)$_3$Si—C$_3$H$_6$—NH—CO—CH=CH—CO—OH; and

[(EtO)$_3$Si—C$_3$H$_6$—NH$_3$]$^+$[EtO—CO—CH=CH—CO—O]$^-$, the balance being oligomeric compounds derived from these two types of the compounds.

Preparation of Emulsion E.

A mixture of 1 g of a vinyl siloxane-chloroplatinic acid complex and 99 g of a vinyl siloxane was uniformly admixed with 25 g of a polyoxyethylene (10 moles addition of ethylene oxide) nonylphenyl ether by using a homomixer followed by gradual addition of 375 g of water under agitation to give an aqueous emulsion which was subjected to secondary emulsification by passing through a high-pressure homogenizer to give a stable aqueous emulsion, which is referred to as the Emulsion E hereinafter.

Preparation of Emulsion G.

A mixture of 300 g of dioctyl tin dilaurate and 50 g of a polyoxyethylene (10 moles addition of ethylene oxide) nonylphenyl ether was, under agitation by using a homomixer, gradually admixed with 650 g of water to give an aqueous emulsion which was subjected to secondary emulsification by passing through a high-pressure homogenizer to give a stable aqueous emulsion, which is referred to as the Emulsion G hereinafter, to serve as a catalyst for the condensation reaction.

Example 1.

A uniform aqueous dispersion was obtained by mixing 100 parts of a colloidal silica dispersion containing 20 parts of a colloidal silica (Snowtex C, a product by Nissan Chemical Co.) as the ingredient C with 11.1 parts of the Solution D corresponding to 5 parts of the effective ingredient and 5 parts of 3-glycidyloxypropyl trimethoxy silane as the ingredient F under agitation followed by further continued agitation for additional 30 minutes.

This aqueous dispersion was gradually added under agitation to 250 parts of the Emulsion A1 containing 100 parts of the effective ingredient followed by further addition of 16.7 parts of the Emulsion B1 containing 5 parts of the methyl hydrogen polysiloxane and 3 parts of the Emulsion E containing 0.005 part of the effective ingredient to give a silicone-based aqueous emulsion composition of the invention, which was subjected to the evaluation tests as described before to give the results shown in Table 1 below. The rating of the uniformity of the cured film was "A". The test for the adhesive bonding to the substrate surface was undertaken with test panels of concrete, cement mortar, glass, copper and wood, on each of which rating of the adhesive bonding was "A".

Example 2.

The formulation of the silicone-based aqueous emulsion composition was the same as in Example 1 excepting for a decrease in the amount of the Emulsion B1 from 16.7 parts to 0.3 part and replacement of 100 parts of the colloidal silica dispersion with 200 parts of the Emulsion C containing 20 parts of the polymethyl sil sesquioxane. The ratings of the uniformity of the cured film and the adhesive bonding to the surface of various substrates were all "A". The results of the other evaluation tests are shown in Table 1.

Example 3.

The formulation of the silicone-based aqueous emulsion composition was the same as in Example 1 excepting for a decrease in the amount of the emulsion B1 from 16.7 parts to 1.7 parts and increases of the amount of the Solution D from 11.1 parts to 22.2 parts, the amount of the Emulsion E from 3 parts to 50 parts and the amount of the ingredient F from 5 parts to 10 parts. The rat ings of the uniformity of the cured film and the adhesive bonding to the surface of various substrates were all "A". The results of the other evaluation tests are shown in Table 1.

Example 4.

A uniform aqueous dispersion was obtained by mixing 250 parts of the same colloidal silica dispersion as used in Example 1 containing 50 parts of colloidal silica with 6.7 parts of the Solution D corresponding to 3 parts of the effective ingredient under agitation followed by further continued agitation for additional 30 minutes.

This aqueous dispersion was gradually added under agitation to 250 parts of the Emulsion A2 containing 100 parts of the effective ingredient followed by further addition of 6.7 parts of the Emulsion B2 containing 2 parts of the methyl hydrogen polysiloxane and 10 parts of the Emulsion E containing 0.02 parts of the effective ingredient to give a silicone-based aqueous emulsion composition of the invention, which was subjected to the evaluation tests. The ratings of the uniformity of the cured film and the adhesive bonding to the surface of various substrates were all "A". The results of the other evaluation tests are shown in Table 1.

Example 5.

The formulation of the silicone-based aqueous emulsion composition was the same as in Example 4 excepting for an increase in the amount of the Emulsion B2 from 6.7 parts to 33.3 parts, decrease in the amount of the colloidal silica dispersion from 250 parts to 25 parts, increase in the amount of the Solution D from 6.7 parts to 11.1 parts and additional admixture of 5 parts of the ingredient F. The ratings of the uniformity of the cured film and the adhesive bonding to the surface of various substrates were all "A". The results of the other evaluation tests are shown in Table 1.

Comparative Example 1.

The formulation of the silicone-based aqueous emulsion composition was the same as in Example 1 excepting for replacement of 3 parts of the Emulsion E with 6.7 parts of the Emulsion G containing 2 parts of the effective ingredient. The rating of the uniformity of the cured film was "B" but the ratings of the adhesive bonding to the surface of various substrates were all "A". The results of the other evaluation tests are shown in Table 1.

Comparative Example 2.

The formulation of the silicone-based aqueous emulsion composition was the same as in Comparative Example 1 excepting for replacements of 250 parts of the Emulsion A1 with 250 parts of the Emulsion A2 and 16.7 parts of the emulsion B1 with 33.3 parts of the Emulsion B2 and a decrease in the amount of the colloidal silica dispersion from 100 parts to 25 parts. The rating of the uniformity of the cured film was "C" but the ratings of the adhesive bonding to the surface of various substrates were all "A". The results of the other evaluation tests are shown in Table 1.

Comparative Example 3.

The formulation of the silicone-based aqueous emulsion composition was the same as in Example 1 excepting for the omission of the colloidal silica dispersion and replacement of 6.7 parts of the Emulsion G with 3 parts of the Emulsion E. The rating of the uniformity of the cured film was "A" but the ratings of the adhesive bonding to the surface of various substrates were "B" on the glass and wooden plates and "C" on the concrete, cement mortar and copper plates. The results of the other evaluation tests are shown in Table 1.

Comparative Example 4.

The formulation of the silicone-based aqueous emulsion composition was the same as in Example 1 excepting for the omissions of the Solution D and ingredient F and replacement of 6.7 parts of the Emulsion G with 3 parts of the Emulsion E. The rating of the uniformity of the cured film was "A" but the ratings of the adhesive bonding to the surface of various substrates were "B" on the glass and wooden plates and "C" on the concrete, cement mortar and copper plates. The results of the other evaluation tests are shown in Table 1.

TABLE 1

| | Tensile tests | | Fabric coating test | | Seam line | Flame |
| --- | --- | --- | --- | --- | --- | --- |
| | Ultimate elongation, % | Tensile strength, kgf/cm² | Coating amount, g/m² | Flexibility, g | tear strength, kgf | retardancy, mm/min. |
| Example | | | | | | |
| 1 | 250 | 24 | 46 | 20 | 76 | 35 |
| 2 | 290 | 19 | 44 | 19 | 69 | 30 |
| 3 | 200 | 28 | 47 | 24 | 79 | 28 |
| 4 | 180 | 31 | 44 | 26 | 81 | 25 |
| 5 | 350 | 16 | 48 | 22 | 57 | 56 |
| Comparative Example | | | | | | |
| 1 | 380 | 25 | 45 | 24 | 68 | 39 |
| 2 | — | — | 48 | 26 | 53 | 58 |
| 3 | 560 | 8 | 48 | 14 | 17 | 170 |
| 4 | 150 | 12 | 46 | 21 | 25 | 110 |

What is claimed is:

1. A silicone-based aqueous emulsion composition which comprises:
   (a) water as the dispersion medium of the emulsion composition; and
   (b) a combination of ingredients, as the dispersed phase in the dispersion medium, comprising:
      (A) 100 parts by weight of an organopolysiloxane having, in a molecule, at least two alkenyl groups bonded to the silicon atoms;
      (B) from 0.05 to 20 parts by weight of an organohydrogen polysiloxane having, in a molecule, at least two hydrogen atoms directly bonded to the silicon atoms;
      (C) from 1 to 100 parts by weight of a powder of a colloidal silica or a polyorganosilsesquioxane;
      (D) from 0.5 to 20 parts by weight of a reaction product of an amino group-containing organosilane compound and a carboxylic acid anhydride compound; and
      (E) from 0.0001 to 1 part by weight of a catalytic compound for the hydrosilation reaction between the alkenyl groups in the ingredient (A) and the silicon-bonded hydrogen atoms in the ingredient (B).

2. The silicone-based aqueous emulsion composition as claimed in claim 1 of which the component (b) further comprises:
   (F) 20 parts by weight or less of an organosilane compound having an epoxy group in the molecule or a partial hydrolysis-condensation product thereof.

3. The silicone-based aqueous emulsion composition as claimed in claim 1 in which the ingredient (A) is an organopolysiloxane represented by the general formula

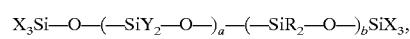

$X_3Si—O—(—SiY_2—O—)_a—(—SiR_2—O—)_bSiX_3,$ in which each R is, independently from the others, a monovalent hydrocarbon group selected from the group consisting of alkyl groups and aryl groups each having 20 or less carbon atoms, each X is, independently from the others, a hydroxy group, an alkoxy group having 1 to 20 carbon atoms or a monovalent hydrocarbon group selected from the group consisting of alkyl groups, alkenyl groups and aryl groups each having 20 or less carbon atoms, each Y is, independently from the others, X or a siloxy group represented by the general formula —(—O—SiX$_2$)$_c$X, X being as defined above and the subscript c being a positive integer not exceeding 1000, the subscript a is 0 or a positive integer not exceeding 1000 and the subscript b is a positive integer in the range from 100 to 10000, with the proviso that at least two of the groups denoted by X are alkenyl groups.

4. The silicone-based aqueous emulsion composition as claimed in claim 3 in which the subscript a in the general formula is 0 or a positive integer not exceeding 100.

5. The silicone-based aqueous emulsion composition as claimed in claim 3 in which the subscript b in the general formula is a positive integer in the range from 1000 to 5000.

6. The silicone-based aqueous emulsion composition as claimed in claim 1 in which the ingredient (B) is an organohydrogen polysiloxane represented by the general formula

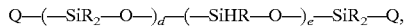

Q—(—SiR$_2$—O—)$_d$—(—SiHR—O—)$_e$—SiR$_2$—Q, in which each R is, independently from the others, a monovalent hydrocarbon group selected from the group consisting of alkyl groups and aryl groups each having 20 or less carbon atoms, Q is R or a hydrogen atom, the subscript d is a positive integer not exceeding 1000 and the subscript e is 0 or a positive integer not exceeding 1000 with the proviso that, when e is 0, each Q is a hydrogen atom and, when e is 1, at least one of the groups denoted by Q is a hydrogen atom.

7. The silicone-based aqueous emulsion composition as claimed in claim 1 in which the amount of the ingredient (B) is in the range from 0.1 to 10 parts by weight per 100 parts by weight of the ingredient (A).

8. The silicone-based aqueous emulsion composition as claimed in claim 1 in which the amount of the ingredient (C) is in the range from 5 to 50 parts by weight per 100 parts by weight of the ingredient (A).

9. The silicone-based aqueous emulsion composition as claimed in claim 1 in which the amino group-containing organosilane compound to form a reaction product as the ingredient (D) with a carboxylic acid anhydride is represented by the general formula

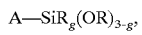

A—SiR$_g$(OR)$_{3-g}$, in which each R is, independently from the others, a monovalent hydrocarbon group selected from the group consisting of alkyl groups and aryl groups each having 20 or less carbon atoms, A is an unsubstituted or substituted amino group of the formula —R$^1$—(—NH—R$^1$—)$_h$—NH—R$^2$, each R$^1$ being, independently from the others, a divalent hydrocarbon group having 6 or less carbon atoms, R$^2$ being R$^1$ or a hydrogen atom and the subscript h being 0 or a positive integer not exceeding 6, and the subscript g is 0, 1 or 2.

10. The silicone-based aqueous emulsion composition as claimed in claim 1 in which the carboxylic acid anhydride compound to form a reaction product as the ingredient (D) with an amino group-containing organosilane compound is selected from the group consisting of phthalic anhydride, succinic anhydride, methylsuccinic anhydride, maleic anhydride, glutaric anhydride and itaconic anhydride.

11. The silicone-based aqueous emulsion composition as claimed in claim 1 in which the amount of the ingredient (D) is in the range from 1 to 10 parts by weight per 100 parts by weight of the ingredient (A).

12. The silicone-based aqueous emulsion composition as claimed in claim 1 in which the ingredient (E) is a platinum compound.

13. The silicone-based aqueous emulsion composition as claimed in claim 12 in which the platinum compound as the ingredient (E) is selected from the group consisting of chloroplatinic acid, alcohol-modified chloroplatinic acid and complexes of chloroplatinic acid with a vinyl siloxane compound.

14. The silicone-based aqueous emulsion composition as claimed in claim 1 in which the amount of the ingredient (E) is in the range from 0.005 to 0.1 part by weight per 100 parts by weight of the ingredient (A).

15. The silicone-based aqueous emulsion composition as claimed in claim 2 in which the organosilane compound having an epoxy group in the molecule as the ingredient (F) is selected from the group consisting of 3-glycidyloxypropyl trimethoxy silane, 3-glycidyloxypropyl dimethoxy methyl silane, 2-(3,4-epoxycyclohexyl)-ethyl trimethoxy silane and 2-(3,4-epoxycyclohexyl)ethyl dimethoxy methyl silane.

16. The silicone-based aqueous emulsion composition as claimed in claim 2 in which the amount of the ingredient (F) does not exceed 10 parts by weight per 100 parts by weight of the ingredient (A).

17. The composition of claim 1, wherein the powder (C) has an average particle diameter of 5 to 200 nm.

18. The composition of claim 1, wherein the powder (C) is polymethylsilsesquioxane.

19. The composition of claim 1, wherein the reaction product (D) is prepared from a mixture containing at least one mole of the acid anhydride compound per mole of the —NH— groups in the amino-containing silane compound.

* * * * *